March 27, 1951 W. M. HALL 2,546,500
ELECTRICAL CIRCUITS
Filed Jan. 22, 1947

INVENTOR
WILLIAM M. HALL
BY Elmer J. Gorn
ATTORNEY

Patented Mar. 27, 1951

2,546,500

UNITED STATES PATENT OFFICE 2,546,500

ELECTRICAL CIRCUITS

William M. Hall, Lexington, Mass., assignor to Raytheon Manufacturing Company, Newton, Mass., a corporation of Delaware Application January 22, 1947, Serial No. 723,558

12 Claims. (Cl. 250—27)

This invention relates to electrical circuits, and more particularly to circuits for detecting radio-frequency energy.

In radio-frequency transmission systems which use a device of the so-called magnetron oscillator type as a source of radio-frequency energy, it is desirable, in order to protect the source from damage, to disconnect the magnetron from its power supply or operating voltage if said magnetron fails at any time to produce radio-frequency energy. A protective circuit for this purpose should preferably be rather sensitive to changes in radio-frequency output of the magnetron. It is also desirable to be able to measure radio-frequency energy within certain power ranges.

While not limited thereto, this invention is particularly useful in the frequency range at which magnetron oscillators normally operate, namely, the microwave region.

Neon lamps or similar gaseous-discharge or blow-discharge devices have been used in the past as detectors or indicators of radio-frequency power. It has been found that the radio-frequency field intensity required to ionize or ignite lamps of this type, if radio-frequency energy alone is depended upon for ignition, is so high that once such lamps have been ignited they will overheat and deteriorate very rapidly.

An object of this invention is to devise a sensitive protective system and control circuit for magnetron oscillators, which will function to disconnect the operating voltage from such magnetrons if they fail to radiate radio-frequency energy.

Another object is to provide a sensitive circuit for detecting and/or measuring radio-frequency energy.

A further object is to devise a circuit whereby neon lamps or similar gaseous-discharge devices may be utilized to detect radio-frequency energy, without the necessity of exposing such devices to high-intensity radio-frequency fields with their consequent overheating and deterioration of the devices.

The foregoing and other objects of the invention will be best understood from the following description of some exemplifications thereof, reference being had to the accompanying drawing, wherein.

I have found that if a neon lamp or similar device is preionized by direct or low-frequency current supplied to it through a relatively high resistance, then such a lamp becomes a very sensitive detector of radio-frequency energy and may be effectively utilized as such. I have found that the effective or apparent resistance of such a lamp is varied when it is exposed to a radio-frequency field, due to the increase in ionization of the gaseous atmosphere thereof by the radio-frequency energy. When the intensity of the radio-frequency energy increases, the effective resistance of the neon lamp decreases, and vice versa. Therefore, the amount of the voltage drop across the lamp, under these conditions of preionization, becomes a very sensitive indication of the intensity of the radio-frequency field in which the lamp is immersed. Moreover, with preionization as above described, for any predetermined indication the radio-frequency field intensity required on the lamp can be very much less than that required thereon in order to produce the same indication without such preionization, thus eliminating the necessity for high-intensity fields on the lamp, along with the deleterious effects of such fields on the lamp.

Figure 1:
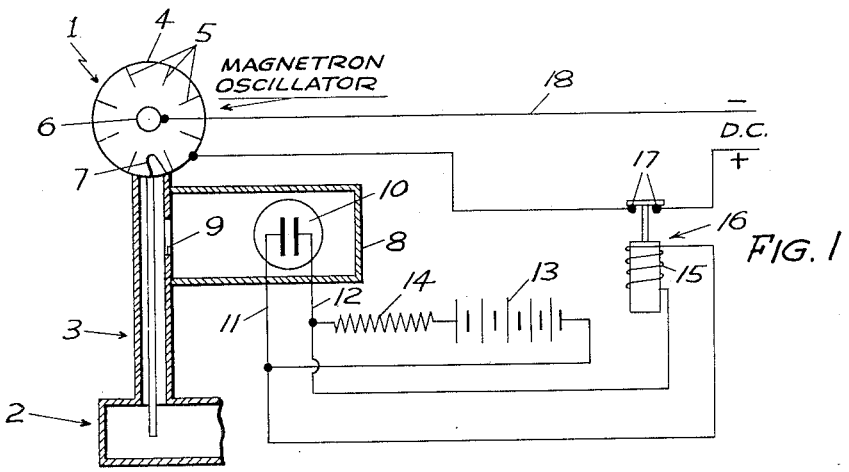
Fig. 1 is a schematic representation of a protective system embodying the invention.

Now referring to Fig. 1, an electron-discharge device 1 of the magnetron type is adapted to supply radio-frequency energy to a hollow metallic waveguide 2 by means of a suitable coaxial transmission line 3. Magnetron 1, shown schematically, includes, for example, an evacuated envelope 4, made of highly conductive material, such as copper, and provided with a plurality of inwardly-directed, radially-disposed anode vanes 5.

Centrally located in envelope 4 is a highly electron-emissive cathode member 6, for example, of the well-known alkaline-earth metal-oxide type, said cathode being provided with conventional means (not shown) for raising the temperature thereof to a level sufficient for thermionic emission. As is well known, such a device as magnetron oscillator 1, when provided with means for establishing magnetic flux therein and when properly energized by an operating voltage from a power supply, is adapted to generate radio-frequency oscillations in the cavities provided between adjacent vanes 5.

Magnetron 1 delivers radio-frequency energy to waveguide 2 through transmission line 3 aforesaid, which is coupled to oscillator 1, for example, by a loop 7. The central conductor of line 3 extends into the interior of waveguide 2 near one end thereof, through an opening provided in a side wall of said guide, to serve as an exciting rod or exciting probe for said guide. The outer conductor of line 3 is connected at one end to envelope 4 and at its opposite end to the wall of guide 2.

An outstanding closed hollow chamber 8 is coupled to the radio-frequency energy in line 3 by means of a suitable opening 9 in said line which communicates with the interior of said chamber. A discharge device 10, for example of the cold-cathode glow-discharge gaseous diode type, such as an ordinary neon bulb, is mounted inside chamber 8, a pair of leads 11 and 12 being connected to the respective electrodes of diode 10 and extending outside of said chamber. Discharge device 10, by being mounted inside chamber 8, is exposed to the radio-frequency energy being transmitted along line 3 to waveguide 2. Lead 11 is connected directly to one terminal of a direct current preionization source 13, for example a battery, while lead 12 is connected through a high resistance 14 to the other terminal of source 13. Leads 11 and 12 are also connected to opposite ends of the operating winding 15 of a relay 16 which controls a pair of contacts 17. The voltage drop across device or lamp 10 is thus applied directly across relay winding 15.

The negative side of a suitable source of direct current of high potential is connected, by means of a lead 18, directly to cathode 6 of magnetron 1, while the positive side of said source is connected, in series with contacts 17 of relay 16, to the anode 4 of magnetron 1. It may therefore be seen that, when contacts 17 are closed, a high operating voltage is applied between cathode 6 and anode 4 of the magnetron 1 and that, when said contacts are open, the operating voltage is disconnected from said magnetron.

In the system disclosed, magnetron 1 is intended to operate in a continuous manner, so that under normal conditions radio-frequency energy is being transmitted by line 3 and is coupled to device 10. Since the presence of radio-frequency energy, or an increase in intensity of radio-frequency energy, decreases the effective resistance of bulb 10 as compared to what it would otherwise be, the voltage drop across bulb 10 is normally rather low and is insufficient to energize relay 16 to open its normally-closed contacts 17. Therefore, under normal conditions, as shown in Fig. 1, and as long as radio-frequency energy is being transmitted along line 3, relay 16 is deenergized, contacts 17 are closed, and operating voltage is maintained on the magnetron 1.

When there is a decrease or cessation of radio-frequency energy in line 3, due to an abnormal condition, the effective resistance of bulb or lamp 10 is increased because of the decrease in ionization of the gaseous atmosphere thereof to an amount of ionization approaching that produced by preionization source 13. When the effective resistance of bulb 10 increases, the amount of current flowing in the series circuit 13—14—10 decreases, resulting in a smaller RI voltage drop in resistance 14 and therefore a larger voltage drop across lamp 10, because the voltage of battery 13 is relatively fixed. Since the voltage drop across the lamp increases in response to this change of radio-frequency energy, the voltage applied across winding 15 of relay 16 increases, increasing the current through said winding, energizing the relay and opening contacts 17, thus disconnecting or removing the operating voltage from magnetron 1. By the above operation, an automatic protective system is provided for the magnetron, the operating voltage being disconnected from the magnetron if it fails at any time to produce radio-frequency energy.

Since a small change in radio-frequency intensity is sufficient to produce, because of the preionization of the bulb, a rather large change in voltage drop across the lamp, the system as a whole is quite sensitive, and only a low-intensity radio-frequency field is required on the bulb.

Figure 2:
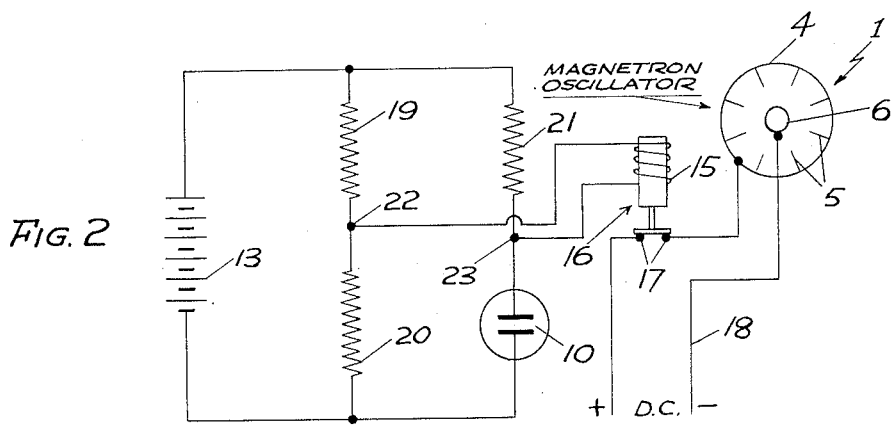
Fig. 2 is a diagrammatic representation of a modified protective circuit.

Now referring to Fig. 2, this figure shows a bridge circuit by means of which the sensitivity of the system to changes in radio-frequency energy may be increased. In Fig. 2, elements the same as those of Fig. 1 are denoted by the same reference numerals. The gaseous-discharge device 10 of Fig. 2 is intended to be coupled to the radio-frequency energy output of magnetron 1, similarly to Fig. 1.

A pair of resistors 19 and 20 are connected in series across the direct current preionization source 13. A resistor 21 is connected in series with the gaseous-discharge device or neon lamp 10 across source 13. Numeral 22 denotes the common point of the resistors 19 and 20, while numeral 23 denotes the common point of diode 10 and resistor 21. One end of relay winding 15 is connected to point 22, and the opposite end to point 23.

By adjustment of the various resistors 19, 20, and 21, points 22 and 23 in the bridge 19—20—21—10 can be set at substantially the same potential in the absence of radio-frequency energy, so that a small change in radio-frequency energy applied to device 10 will make a correspondingly large change in current through the relay winding 15 connected between points 22 and 23. By properly adjusting the potential of point 22 with respect to point 23, the current through the relay 16 can be made to either increase, decrease, or change sign with an increase in radio-frequency applied to bulb 10.

In Fig. 2, the variations of the various resistors have been so adjusted and proportioned that under normal conditions, which are the conditions shown and in which radio-frequency energy is being produced by magnetron 1, there is insufficient current through the relay winding 15 to energize relay 16, so that normally-closed contacts 17 remain closed and operating voltage is maintained on the magnetron 1.

When the radio-frequency energy applied to bulb 10 decreases, the effective resistance of said bulb is increased, as in Fig. 1, resulting in a larger voltage drop across lamp 10 and a consequent change in the potential of point 23. The voltage applied across winding 15 is therefore changed, in such a way as to increase the current through said winding, energizing relay 16 and opening contacts 17 to deenergize magnetron 1 by removing the operating voltage therefrom. Here, as in Fig. 1, the operating voltage is disconnected from the magnetron if it fails at any time to produce radio-frequency energy. The advantages resulting from preionization of the bulb 10 are obtained in this circuit also.

Figure 3:
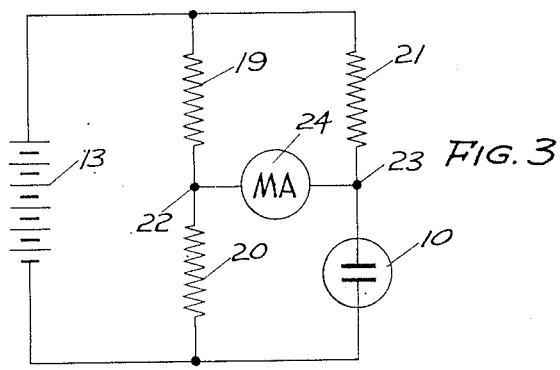
Fig. 3 is a diagrammatic representation of a measuring circuit embodying the invention.

In Fig. 3, a radio-frequency measuring circuit embodying my invention is shown. The bridge circuit is substantially the same as that of Fig. 2, with resistors 19 and 20 in series across source 13, and resistor 21 and device 10 also in series across said source. Device 10 is adapted to be exposed or coupled to the radio-frequency energy which it is desired to measure, the effective resistance of this device changing with a change in radio-frequency energy as before. A suitable current meter 24 is connected between points 22 and 23 of the bridge.

Small changes in radio-frequency energy applied to the bulb 10 will make correspondingly large changes in current through meter 24, due to the change in effective resistance of bulb 10 caused by a change in radio-frequency energy impinging thereon. Thus the current through meter 24 depends on the intensity of the radio-frequency energy to which bulb 10 is exposed and which is being measured. A radio-frequency energy measuring circuit has therefore been devised in which a neon bulb is used and in which the above-described advantages of protection of the bulb, due to preionization thereof, are obtained.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. A circuit for detecting radio-frequency energy, comprising a gaseous-discharge diode, means for coupling said diode to radio-frequency energy, a source of direct current, means connecting said diode in series with a resistor across said source to preionize the gaseous atmosphere of said diode, whereby upon coupling of said diode to radio-frequency energy the effective resistance thereof is varied, and means connected across said diode, and responsive to said resistance variation, for controlling said radio frequency energy.

2. A circuit for detecting radio-frequency energy, comprising a gaseous-discharge diode, means for coupling said diode to a source of radio-frequency energy, a source of direct current, means connecting said diode in series with a first resistor across said source to preionize the gaseous atmosphere of said diode, whereby upon coupling of said diode to said radio-frequency energy the effective resistance thereof is varied, a pair of resistors connected in series across said source, and means connected between the common point of said pair of resistors and the common point of said diode and said first resistor, and responsive to said resistance variation, for controlling said radio frequency energy.

3. A circuit for detecting radio-frequency energy, comprising a gaseous-discharge diode, means for coupling said diode to radio-frequency energy, a source of direct current, means connecting said diode in series with a resistor across said source to preionize the gaseous atmosphere of said diode, whereby upon coupling of said diode to radio-frequency energy the effective resistance thereof is varied, and a relay controlling said radio frequency energy and having a winding connected directly across said diode, the voltage applied across said winding being variable in response to said resistance variation to vary the current through said winding.

4. A circuit for detecting radio-frequency energy, comprising a gaseous-discharge diode, means for coupling said diode to radio-frequency energy, a source of direct current, means connecting said diode in series with a first resistor across said source to preionize the gaseous atmosphere of said diode, whereby upon coupling of said diode to radio-frequency energy the effective resistance thereof is varied, a pair of resistors connected in series across said source, and a relay controlling said radio frequency energy and having a winding connected between the common point of said pair of resistors and the common point of said diode and said first resistor, the voltage applied across said winding being variable in response to said resistance variation to vary the current through said winding.

5. A circuit for detecting radio-frequency energy comprising a gaseous-discharge diode adapted to be coupled to variable-amplitude radio-frequency energy, a source of direct current, means connecting said diode in series with a resistor across said source to preionize the gaseous atmosphere of said diode, whereby upon decrease in amplitude of the radio-frequency energy to which said device is coupled the effective resistance thereof is increased, and means connected across said diode, and responsive to said resistance increase, for controlling said radio frequency energy.

6. A circuit for detecting radio-frequency energy, comprising a gaseous-discharge diode adapted to be coupled to variable-amplitude radio-frequency energy, a source of direct current, means connecting said diode in series with a first resistor across said source to preionize the gaseous atmosphere of said diode, whereby upon decrease in amplitude of the radio-frequency energy to which said device is coupled the effective resistance thereof is increased, a pair of resistors connected in series across said source, and means connected between the common point of said pair of resistors and the common point of said diode and said first resistor, and responsive to said resistance increase, for controlling said radio frequency energy.

7. A circuit for detecting radio-frequency energy, comprising a gaseous-discharge diode adapted to be coupled to variable-amplitude radio-frequency energy, a source of direct current, means connecting said diode in series with a resistor across said source to preionize the gaseous atmosphere of said diode, whereby upon decrease in amplitude of the radio-frequency energy to which said device is coupled the effective resistance thereof is increased, and a relay controlling said radio-frequency energy and having a winding connected in circuit with said diode, the voltage applied across said winding being variable in response to said resistance increase to vary the current through said winding.

8. A circuit for detecting radio-frequency energy, comprising a gaseous-discharge diode adapted to be coupled to variable-amplitude radio-frequency energy, a source of direct current, means connecting said diode in series with a first resistor across said source to preionize the gaseous atmosphere of said diode, whereby upon decrease in amplitude of the radio-frequency energy to which said device is coupled the effective resistance thereof is increased, a pair of resistors connected in series across said source, and a relay controlling said radio-frequency energy and having a winding connected between the common point of said pair of resistors and the common point of said diode and said first resistor, the voltage applied across said winding being variable in response to said resistance increase to vary the current through said winding.

9. A protective system, comprising a source of radio-frequency energy, controllable means for supplying an operating voltage to said source, a gaseous-discharge device exposed to the radiated radio-frequency energy output of said source, means comprising a resistor and a current source in series with said gaseous-discharge device for preionizing the gaseous atmosphere of said device whereby upon change of said radio-frequency energy output the effective resistance of said device is varied, and means responsive to said resistance variation for controlling said controllable means.

10. A protective system, comprising a source of microwave energy, controllable means for supplying an operating voltage to said source, a gaseous-discharge device adapted to be coupled to the microwave energy output of said source, means comprising a resistor and a current source in series with said gaseous-discharge device for preionizing the gaseous atmosphere of said device whereby upon change of said radio-frequency energy output the effective resistance of said device is varied, and means responsive to said resistance variation for controlling said controllable means in such a way as to maintain said voltage connected to said source as long as said source is producing a microwave energy output.

11. A protective system, comprising a source of radio-frequency energy, controllable means for supplying an operating voltage to said source, a gaseous-discharge device exposed to radiated radio-frequency energy from said source, means comprising a resistor and a current source in series with said gaseous-discharge device for preionizing the gaseous atmosphere of said device whereby upon change of said radio-frequency energy output the effective resistance of said device is varied, and means responsive to said resistance variation for controlling said controllable means in such a way as to disconnect said voltage from said source when said source is not producing a radio-frequency energy output.

12. A protective system, comprising a source of radio-frequency energy, controllable means for supplying an operating voltage to said source, a gaseous-discharge device having the gaseous medium thereof directly exposed to the radio-frequency energy output of said source, means comprising a resistor and a current source in series with said gaseous-discharge device for preionizing the gaseous atmosphere of said device whereby upon change of said radio-frequency energy output the effective resistance of said device is varied, and means responsive to said resistance variation for controlling said controllable means, said controlling means acting to maintain said voltage connected to said source as long as said source is producing a radio-frequency energy output and acting to disconnect said voltage from said source when said source is not producing a radio-frequency energy output.

WILLIAM M. HALL.

REFERENCES CITED

The following references are of record in the file of this patent:

UNITED STATES PATENTS

| Number | Name | Date |
|---|---|---|
| 915,280 | Fessenden | Mar. 16, 1909 |
| 954,619 | Fleming | Apr. 12, 1910 |
| 979,275 | De Forest | Dec. 20, 1910 |
| 1,738,684 | Bohm | Dec. 10, 1929 |
| 1,961,717 | Thomas | June 5, 1934 |
| 2,122,222 | Vingerhoets | June 28, 1938 |
| 2,123,242 | Hollmann | July 12, 1938 |
| 2,316,576 | Fearon | Apr. 13, 1943 |
| 2,332,873 | Silverman | Oct. 26, 1943 |
| 2,434,297 | Test et al. | Jan. 13, 1948 |
| 2,462,799 | Young | Feb. 22, 1949 |
| 2,479,548 | Young | Aug. 16, 1949 |